Patented Feb. 6, 1940

2,189,721

UNITED STATES PATENT OFFICE 2,189,721

DIBENZYL HEXAHYDRO PHTHALATE

Charles F. Winans, Akron, Ohio, assignor to Wingfoot Corporation, Wilmington, Del., a corporation of Delaware No Drawing. Application October 2, 1937, Serial No. 167,027

1 Claim. (Cl. 260—485)

This invention relates to a new composition of matter. More particularly, it relates to the dibenzyl ester of hexahydro phthalic acid.

Various derivatives of phthalic acid have been suggested in the past for use as plasticizers in plastics, coating compositions, etc. It has now been discovered that the dibenzyl ester of hexahydro phthalic acid possesses a combination of physical and chemical properties which causes it to be suitable to a high degree for use as a plasticizer in such compositions. This compound is free from undesirable color, is chemically inert as regards the usual commercial resins, is quite stable, is non-volatile to a high degree, and is readily miscible with a large number of commercial resins and solvents.

The compound is most readily prepared by refluxing a mixture of benzyl alcohol and hexahydro phthalic acid, the product being formed by the interaction of two mols of the alcohol and one mol of the acid. Simple refluxing of the ingredients in these proportions until no more water is eliminated will produce the desired product. However, toward the end of the reaction it becomes increasingly difficult to drive off the water formed during the reaction so that it will be found that the reaction may be more readily carried to completion if some special means is provided for facilitating the removal from the reaction zone of the water. This may be done by adding various materials such as toluene and xylene to the mix, which materials assist in carrying off the water vapor. The added solvent, if immiscible with the water, may be easily separated from the water and returned to the reaction mass. The easiest method of accomplishing the desired result, however, is to add an excess of benzyl alcohol, an excess up to 100% being used to advantage.

The following specific example will serve to illustrate the preparation of the material.

Example

Benzyl alcohol and hexahydro phthalic acid in the ratio of four mols of the alcohol to one of the acid were mixed and refluxed until no more water was eliminated. The reaction mixture was then distilled to produce 88% of the theoretical yield of dibenzyl hexahydro phthalate which boiled at 220–230° C. at 4 mm. pressure. The product was water white and had a refractive index of 1.5450 at 25° C., a specific gravity of 1.113 at 25° C. and a saponification number of 318. It developed no appreciable color on long standing exposed to the atmosphere.

The material may be readily incorporated into a large number of commercially available resins and is particularly suitable for use with compositions containing ketone resins such as cyclohexanone resins, polystyrene, poly vinyl chloride, glyptal resins, modified glyptal resins, phenol-formaldehyde resins, modified phenol-formaldehyde resins, co-polymers of styrene and dichlorethylene, cellulose nitrate, cellulose acetate, ethyl cellulose, coumarin resins, etc. It may be used also with rubber derivatives such as the chloride and hydrochloride and condensation products derived by treating rubber with chlorostannic acid, sulfonic acids, etc.

This application is a continuation-in-part of copending application Serial No. 40,303, filed September 12, 1935.

What I claim is:

Dibenzyl hexahydro phthalate.

CHARLES F. WINANS.